United States Patent [19]

Gregory

[11] Patent Number: 5,550,945

[45] Date of Patent: Aug. 27, 1996

[54] INTEGRATED IMAGE CONDUIT AND ILLUMINATION

[75] Inventor: Christopher C. Gregory, Yardley, Pa.

[73] Assignee: Galileo Electro-Optics Corporation, Sturbridge, Mass.

[21] Appl. No.: 439,271

[22] Filed: May 11, 1995

[51] Int. Cl.⁶ ................................................. G02B 6/06
[52] U.S. Cl. ................................................. 385/116
[58] Field of Search ........................ 385/115–119, 121, 385/901

[56] References Cited

U.S. PATENT DOCUMENTS

| | | | |
|---|---|---|---|
| 3,261,351 | 7/1966 | Wallace | 385/117 X |
| 3,902,880 | 9/1975 | Strack | 385/116 X |
| 4,173,392 | 11/1979 | Ekinaka et al. | 385/117 |
| 4,272,156 | 6/1981 | Ishibashi et al. | 385/117 |
| 4,360,372 | 11/1982 | Maciejko | 385/115 X |
| 4,593,973 | 6/1986 | Yoshida et al. | 385/116 X |
| 4,725,727 | 2/1988 | Harder et al. | 250/227.28 |
| 4,772,093 | 9/1988 | Abele et al. | 385/119 |
| 4,921,326 | 5/1990 | Wild et al. | 385/117 |
| 5,046,816 | 9/1991 | Lehmann et al. | 385/117 |
| 5,412,749 | 5/1995 | Sayegh et al. | 385/115 |

FOREIGN PATENT DOCUMENTS 3-273202  12/1991  Japan .

*Primary Examiner*—John D. Lee
*Attorney, Agent, or Firm*—Watson Cole Stevens Davis, P.L.L.C.

[57] ABSTRACT

In an image conduit, an annular glass cylinder surrounding an imaging bundle is employed to act as an illumination conduit. The illumination conduit may be a single annular light guiding structure or it may be a multilayer structure or a ring of fibers optically separated from the imaging bundle. The illumination conduit may be provided with a layers of lower index cladding glass to confine the light in an intermediate core. Alternatively, the bottle cladding may be a reflective coating deposited on the outside of the bottle after drawing.

20 Claims, 2 Drawing Sheets

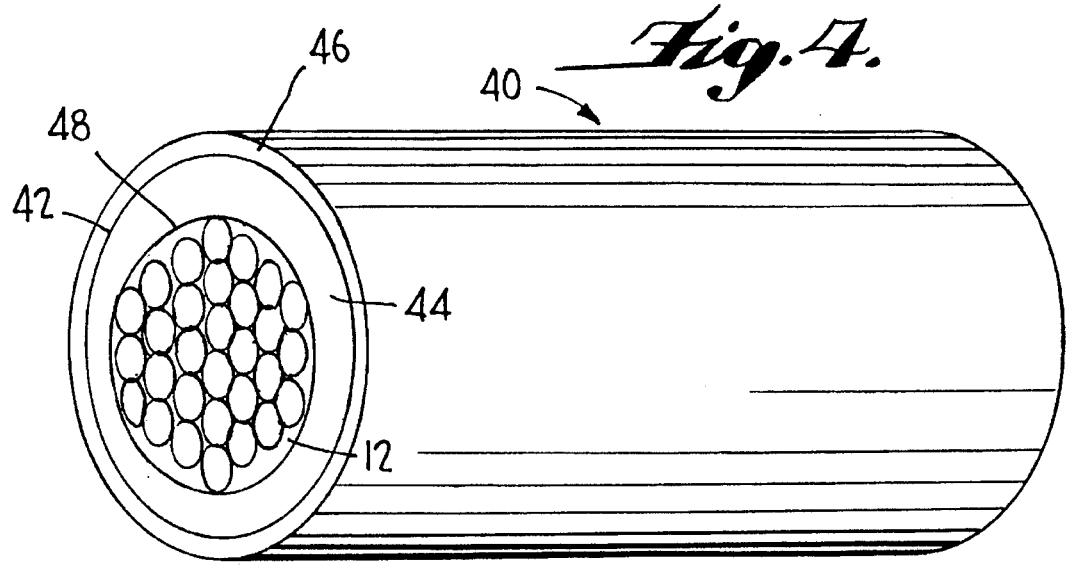
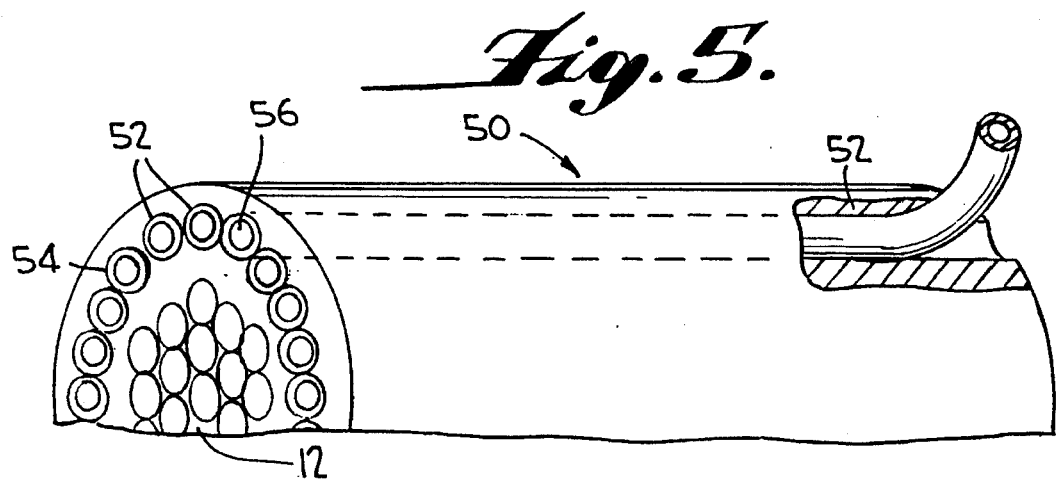
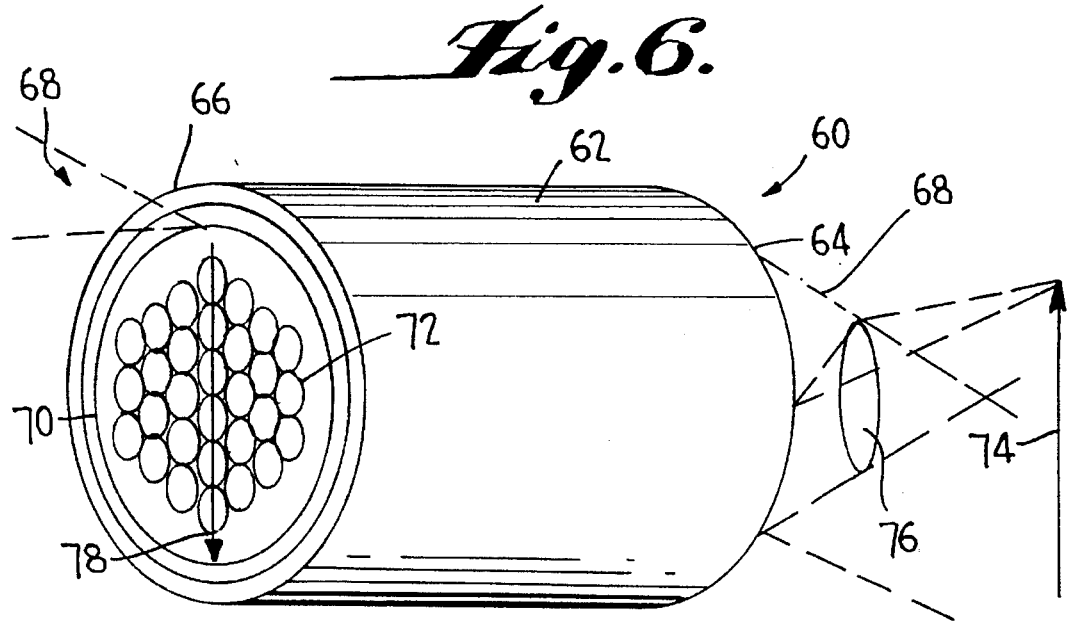

INTEGRATED IMAGE CONDUIT AND ILLUMINATION

BACKGROUND OF THE INVENTION

The invention relates to image conduits and in particular, the invention relates to an integrated image conduit in which an array of imaging fibers in the form of a fused bundle is surrounded by an image illumination conduit which is fused to the bundle along at least a portion thereof.

Most remote imaging applications using fiber bundles require some sort of system to transfer illuminating light to the imaged object. This is normally done with non-coherent fiber bundles illuminated from the viewing end by a bright light source and arranged to uniformly illuminate the target area. It is difficult and expensive to arrange these bundles to uniformly illuminate the target. Also, the illuminating light can often directly enter the imaging optics obscuring the images with excess glare.

In normal fused fiber bundle manufacturing, the final fiber bundle is drawn inside of a glass tube known as the bottle. This bottle acts as an outer jacket to protect the bundle. It also allows enhancing steps to be taken in the drawing process such as applying a vacuum to the bundle as it is drawn.

It is desirable to incorporate the illumination system in the image bundle while keeping it optically separate therefrom. Such an arrangement would improve the manufacturability of the system without degrading the optical quality for many applications.

SUMMARY OF THE INVENTION

The invention is based upon the discovery that the glass bottle surrounding the bundle may be employed to act as a light guide. It then may act as an integrated illumination system for the image conduit. The bottle light guide may be a single annular light guiding structure or it may be made up of segments optically separated from the imaging bundle and each other. In one embodiment, the bottle may be formed of a higher index glass than the fiber bundle claddings. Light launched into the bottle would propagate down the bottle without entering the bundle fibers.

In another embodiment, the bottle may be provided with an overcoating or a layer of lower index bottle cladding glass to confine the light with it. Alternatively, the bottle cladding may be a reflective coating deposited on the outside of the bottle after drawing.

In yet another embodiment, optical separation of the bottle and the image fibers may be enhanced by an inner bottle cladding layer of lower index glass. The inner bottle cladding and the bottle cladding act to confine the illumination in the bottle acting as a core to form a light guiding structure.

In another embodiment, an integrated illumination system may be made with a bottle core comprising a ring of optical fibers. Such an arrangement would allow the object to be illuminated non-uniformly, if desired.

All these configurations enjoy the important aspect of being integrated into a single piece illumination, image transfer device having separate optical paths for the image and the illumination.

BRIEF DESCRIPTION OF THE DRAWINGS

FIG. 4 is an illustration of yet another embodiment of the invention employing an inner bottle cladding layer;

FIG. 5 is an illustration of another embodiment of the invention employing a plurality of fibers arranged in an annular matrix about the imaging bundle; and FIG. 6 is a generalized illustration of an imaging system according to the present invention.

DESCRIPTION OF THE INVENTION

Figure 1:
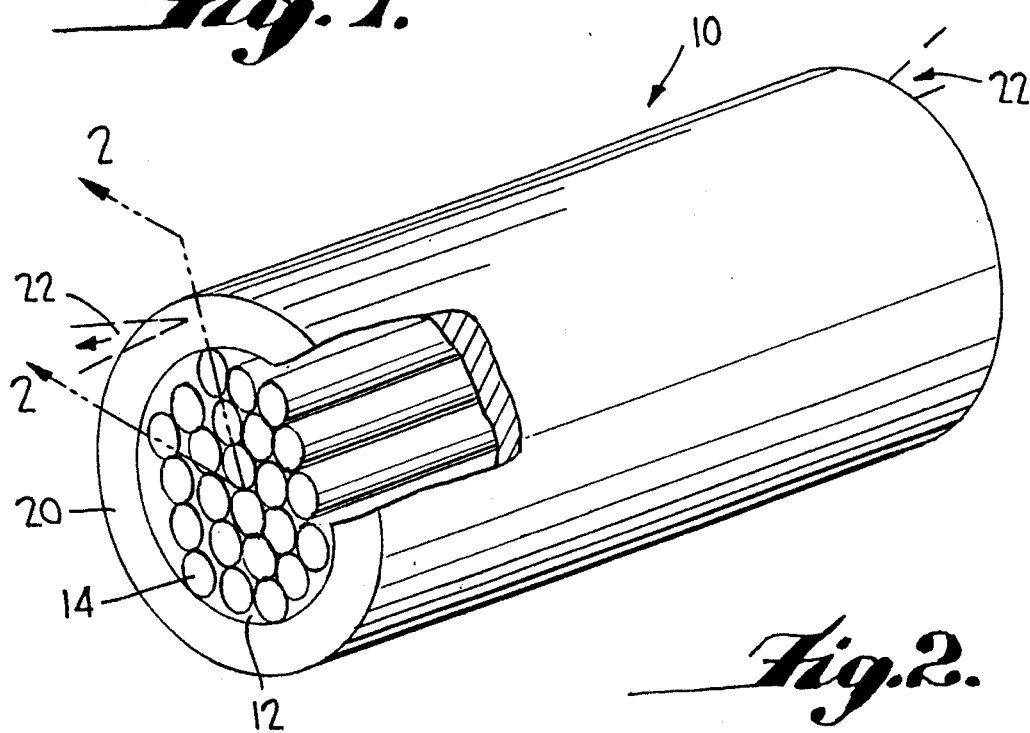
FIG. 1 is an illustration of an integrated image conduit according to one embodiment of the present invention.
Figure 2:
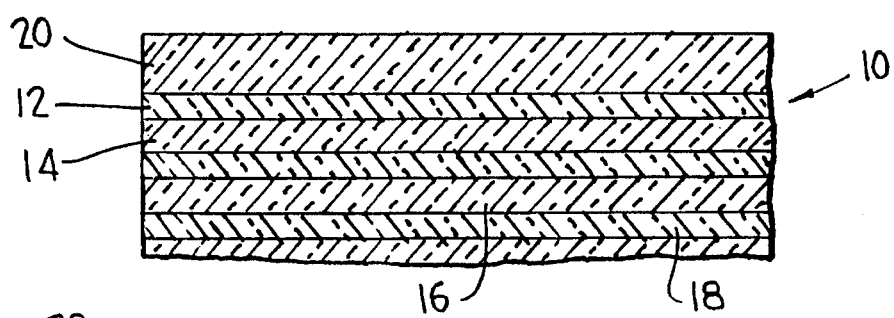
FIG. 2 is a fragmentary sectional view of the image conduit of the invention taken along line 2—2 of FIG. 1.

FIGS. 1 and 2 illustrate an integrated image conduit 10 according to one embodiment of the invention. The image conduit 10 comprises an array imaging bundle 12 of individual imaging fibers 14. Each fiber 14 includes a core 16 and a cladding 18. The fibers 14 are fused together. The integrated image conduit 10 also includes an illumination conduit 20 (sometimes hereinafter referred to as bottle 20). The illumination conduit 20 may be in the form of a single annular light guiding structure fused to the imaging bundle 12, as shown. Also, depending upon the degree to which the structure is drawn, the image conduit 10 may be rigid or flexible. Light 22 may be launched into one end of the imaging conduit and carried to the opposite end for illuminating an object, not shown.

In the arrangement illustrated in FIGS. 1 and 2, the core glass 16 of the fibers 14 has a higher index of refraction than the cladding glass 18 in order to confine light 22 in the fibers 14. In accordance with the invention, the illuminating conduit 20 has an index of refraction that is higher than the cladding glass 18 in order to maintain optical separation between the illumination conduit 20 and the individual fibers 14 in the bundle 12.

Figure 3:
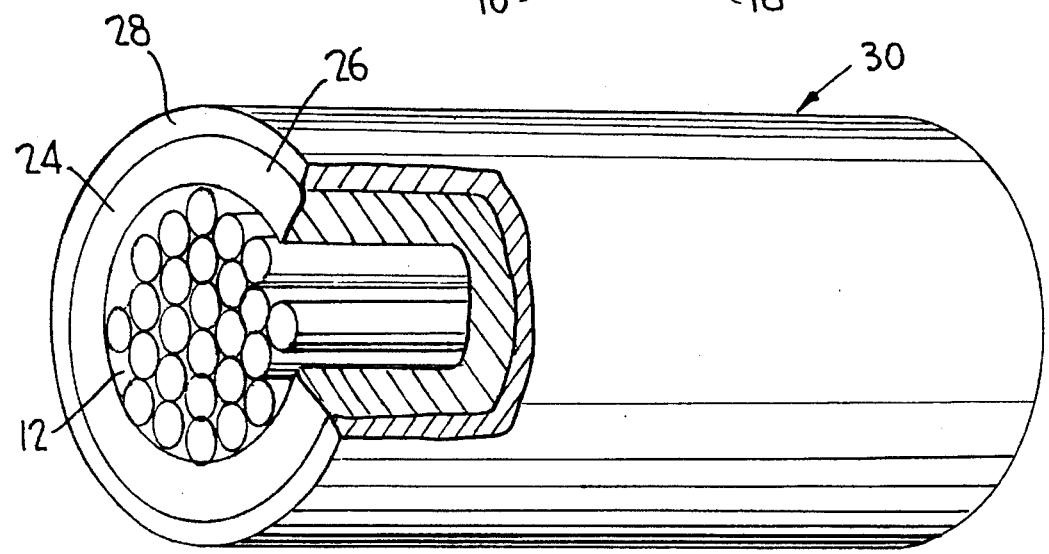
FIG. 3 is an illustration of another embodiment of the invention employing an outer bottle cladding layer.

Referring to FIG. 3 in which like reference numerals are used to describe similar elements, an illuminating conduit 30 is illustrated. In the arrangement of FIG. 3, the bundle of imaging fibers 12 is surrounded by an illuminating conduit 24 which includes an inner annular conduit or core layer 26 and a surrounding overcoat or cladding layer 28. In this arrangement, the cladding layer 28 has an index of refraction lower than the core layer 26 to confine illuminating light 22 within the illuminating conduit 24.

Alternatively, the overcoat 28 may be in the form of a reflective coating deposited on the outside of the core 26 for confining light there within. Such a coating could be deposited on the device after drawing to the appropriate size. The particular material is not as important as maintaining or confining the light to within the conduit 30.

Yet another embodiment of the invention is illustrated in FIG. 4. In this arrangement, the image conduit 40 includes an illumination conduit 42 comprising a core member 44, an outer cladding layer 46 and an inner cladding layer 48. The core layer 44 has an index or refraction higher than the respective outer and inner cladding layers 46 and 48. A reflective coating may be substituted for the outer layer 46.

FIG. 5 illustrates yet another embodiment of the present invention in which the integrated image conduit 50 employs an annular ring of fibers 52 in a matrix 54 surrounding the imaging bundle 12. The fibers 52 include a core portion 56 and an outer cladding layer 58. The cladding layer 58 may be similar to the cladding 12 surrounding the imaging fibers 14. The matrix may be formed of the fused together illumination fiber cladding glass or it may be a separate matrix material. In addition, the matrix 54 may be an acid-soluble glass which would allow the fibers 52 to be separated from the image bundle 12 forming free ends 55, as shown. The free ends 55 may be positioned together to conveniently receive illuminating light 22.

A generalized system 60 for an integrated image illumination system is illustrated in FIG. 6. The system 60 includes an integrated image conduit 62 having an object end 64 and an imaging end 66. Illuminating light 68 is supplied into the image illumination conduit 70 surrounding the image bundle 72. The illumination light 68 is carried to the object end 64 for illuminating an object 74. Light reflected from the object is imaged by an objective optic 76 on to the image bundle 72 which carries it to the image end where it is viewed as an image 78, as illustrated.

Other variations of the invention may be provided, including arrangements in which the optical fibers and the illuminating structure are formed of organic or inorganic materials. Also, in an embodiment contemplated herein, the imaging bundle may be in the form of a plurality of hollow pipes for transferring an image over relatively short distances.

While there have been described what are at present considered to be the preferred embodiments of the present invention, it will be apparent to those skilled in the art that various changes and modifications may be made therein without departing from the invention, and it is intended in the appended claims to cover such changes and modifications as fall within the spirit and scope the invention.

What is claimed is:

1. An integrated image conduit having end portions for transmitting and illuminating an image comprising:

a fused array of imaging fibers having end portions formed in a rod-like bundle for transmitting said image; and an illumination conduit surrounding the fused bundle for transmitting illuminating light and being directly fused to and drawn with said fused array to form an integrated structure over a substantial portion thereof.

2. An integrated image conduit for illuminating a site and transmitting an image therefrom comprising:

a rod-like image transmitting array including a plurality of fused together elongated imaging fiberoptics having opposite ends for transmitting the image from one end to the other; and an illumination conduit having opposite ends surrounding the image transmitting array for carrying illumination to the one end from the other and being directly fused and drawn throughout a substantial portion of its length with a corresponding portion of the illumination conduit to form an integrated structure.

3. The image conduit of claim 2 wherein the imaging fiberoptics each comprise a core and a surrounding cladding.

4. The image conduit of claim 2 wherein the rod-like image transmitting array is cylindrical.

5. The image conduit of claim 2 wherein the illumination conduit comprises an annular cylinder surrounding the rod-like array and fused to a portion thereof.

6. The image conduit of claim 2 wherein the illumination conduit comprises an annular core member and an outer light confining layer surrounding said core member.

7. The image conduit of claim 6 wherein the outer light confining layer comprises at least one of a cladding layer and a reflective layer.

8. The image conduit of claim 6 wherein the outer light confining layer comprises a cladding layer having an index of refraction less than the core member.

9. The image conduit of claim 6 wherein the core member has an index of refraction greater than the outer light confining layer.

10. The image conduit of claim 2 wherein the illumination conduit comprises: a fused together member formed of an annular core member having an inner and outer wall and an outer annular cladding member disposed adjacent the outer wall.

11. The image conduit of claim 10 wherein the core member has an index of refraction and the outer cladding member has an index of refraction lower than the index of refraction of the core member.

12. The image conduit of claim 2 wherein the illumination conduit has an inner wall portion and the image conduit has an outer wall portion fused to the inner wall portion of the illumination conduit.

13. The image conduit of claim 2 wherein the illumination conduit comprises a plurality of optical fibers disposed in an annular array.

14. The image conduit of claim 2 wherein the illumination conduit comprises an annular matrix and a plurality of optical fibers disposed in an annular array within the matrix.

15. The image conduit of claim 14 wherein the matrix comprises chemically leachable glass for permitting partial separation of the image array from the illumination conduit.

16. The image conduit of claim 2 wherein the image conduit comprises a flexible structure.

17. The image conduit of claim 2 wherein the image conduit comprises a rigid structure.

18. A method for manufacturing a monostructure of an illuminating member and an imaging member comprising the steps of:

forming a plurality of imaging fibers in a fused array;

forming a confining annular illumination member around the fused array;

fusing the array and the illumination member together; and drawing the illumination member and the imaging array together in a single process step for fusing the same together.

19. The method of claim 18 further comprising the steps of:

forming the illumination member in an annular array of optical fibers.

20. The method of claim 18 further comprising the steps of:

forming the illumination member in an annular array of optical fibers and embedding the fibers in a matrix.

\* \* \* \* \*